United States Patent [19]

Steffen et al.

[11] 4,241,197

[45] Dec. 23, 1980

[54] GRAFT COPOLYMERS CONTAINING (METH)ACRYLIC ACID OR (METH)ACRYLIC ACID ESTERS

[75] Inventors: Ulrich Steffen, Leverkusen; Heinrich Alberts, Cologne; Richard Prinz, Leverkusen, all of Fed. Rep. of Germany

[73] Assignee: Bayer Aktiengesellschaft, Fed. Rep. of Germany

[21] Appl. No.: 19,363

[22] Filed: Mar. 12, 1979

[30] Foreign Application Priority Data

Mar. 16, 1978 [DE] Fed. Rep. of Germany ....... 2811549

[51] Int. Cl.$^3$ ............................................ C08L 23/00
[52] U.S. Cl. ................................................. 525/309
[58] Field of Search .................... 260/878 R; 525/301, 525/309

[56] References Cited

U.S. PATENT DOCUMENTS

| | | | |
|---|---|---|---|
| 3,742,090 | 6/1973 | Kiuchi et al. | 260/878 R |
| 3,855,353 | 12/1974 | Alberts et al. | 260/878 R |
| 4,107,109 | 8/1978 | Kassal | 526/309 |

*Primary Examiner*—Harry Wong, Jr.
*Attorney, Agent, or Firm*—Connolly and Hutz

[57] ABSTRACT

Graft copolymers consisting of
A. from 10 to 80% by weight of an ethylene/vinyl ester copolymer containing from 1 to 75% by weight of vinyl ester; and
B. from 90 to 20% by weight of a grafted monomer mixture of
  I. from 5 to 50% by weight of acrylonitrile and/or methacrylonitrile;
  II. from 94.9 to 35% by weight of one or more aromatic monovinyl compounds, and
  III. from 0.1 to 15% by weight of (meth)acrylic acid or a (meth)acrylic acid alkyl ester;

the sum of components A and B and of components I to III amounting respectively to 100% by weight.

4 Claims, No Drawings

GRAFT COPOLYMERS CONTAINING (METH)ACRYLIC ACID OR (METH)ACRYLIC ACID ESTERS

This invention relates to graft copolymers of ethylene copolymers as the graft base and a mixture of acrylonitrile, aromatic monovinyl compounds and (meth)acrylic acid or (meth)acrylic acid esters as the graft monomers and to a process for the production thereof.

The radical grafting of styrene/acrylonitrile mixtures onto ethylene copolymers is known to give incompatible and inhomogeneous graft polymers having poor mechanical strength values. In such products, a large part of the resin phase consists of free styrene/acrylonitrile copolymer (J. L. Locatelli, G. Riess, Angew. Makromolekulare Chem. 32 (1973) 117; British Pat. No. (917,498).

By additionally using certain comonomers, such as $\alpha$-olefins (U.S. Pat. No. 3,855,353), vinyl chloride (U.S. Pat. No. 4,071,580) and acrylamide (U.S. Pat. No. 4,153,646), it is possible to improve the grafting yields and also the mechanical properties of the graft copolymers.

However, these monomers also have some disadvantages. The $\alpha$-olefins reduce the molecular weight of the resin phase and are not always quantitatively consumed during the polymerisation reaction. Vinyl chloride cannot generally be used as a comonomer on account of its toxicity. Acrylamide occasionally gives rise to problems in bulk graft copolymerisation reactions on account of its poor solubility in apolar solvents and monomers. In addition, it may give rise to troublesome deposits in the condensers when the graft copolymers are evaporated in screws.

Accordingly, there is a need for graft-active copolymerisable monomers which, with mixtures of aromatic monovinyl compounds, (meth)acrylonitrile and ethylene/vinyl ester copolymers as graft base, give graft copolymers having favourable properties without any of the disadvantages referred to above. It has now been found that this objective may be achieved by using from 0.1 to 15%, by weight, preferably from 0.5 to 12% by weight, of (meth)acrylic acid or (meth)acrylic acid ester, based on the monomer mixture to be grafted.

Accordingly, the present invention relates to graft copolymers of ethylene copolymers and olefinically unsaturated monomers, characterised in that they contain graft-polymerised units of mixtures of (meth)acrylonitrile, one or more aromatic monovinyl compounds, (meth)acrylic acid or (meth)acrylic acid ester on ethylene/vinyl ester copolymers.

Ethylene/vinyl ester copolymers containing from 1 to 75% by weight, preferably from 35 to 50% by weight, of copolymerised vinyl esters may be used as graft bases. Esters of monocarboxylic acids containing from 1 to 10 carbon atoms in the alkyl radical are used as the vinyl esters, vinyl acetate being preferred.

The ethylene/vinyl ester copolymers may have Mooney viscosities ML 4/100° C., as measured in accordance with DIN 53 523, of from 15 to 80, preferably from 20 to 45, and intrinsic viscosities $[\eta]$ of from 0.5 to 1.5 dl/g. These copolymers are soluble in hydrocarbons and, where they have relatively high vinyl ester contents, also in alcohols.

The monomers to be grafted may be selected from (meth)acrylonitrile, aromatic monovinyl compounds such as styrene, $\alpha$-methyl styrene and nucleus-substituted styrenes, such as halogenated and $C_1$–$C_4$ alkylated styrenes, (meth)acrylic acid and (meth)acrylic acid $C_1$–$C_{12}$ alkyl esters.

It is preferred to use acrylonitrile styrene and (meth)acrylic acid $C_1$–$C_4$ alkyl esters.

The mixture of substances used consists of:
(A) from 10 to 80%, by weight, of ethylene/vinyl ester copolymer, preferably ethylene/vinyl acetate copolymer; and
(B) from 90 to 20% by weight, of a monomer mixture to be grafted consisting of:
 (I) from 5 to 50%, by weight, preferably from 5 to 30% by weight, of (meth)acrylonitrile;
 (II) from 94.9 to 35%, by weight, preferably from 94.5 to 58.0%, by weight, of one or more aromatic monovinyl compounds; and
 (III) from 0.1 to 15%, by weight, preferably from 0.5 to 12% by weight, or (meth)acrylic acid or a (meth)acrylic acid alkyl ester.

The sum of components (I) to (III) amounts to 100%.
The graft copolymers obtained consist of:
(A) from 10 to 80%, by weight, preferably from 15 to 25%, by weight, of ethylene/vinyl ester copolymer as the graft base; and
(B) from 90 to 20%, by weight, preferably from 85 to 75%, by weight, of grafted resin phase obtained by copolymerising (meth)acrylonitrile, one or more aromatic monovinyl compounds and (meth)acrylic acid or a (meth)acrylic acid alkyl ester.

The resin phase consists of:
(I) from 5 to 50%, by weight, preferably from 5 to 30%, by weight, of (meth)acrylonitrile;
(II) from 35 to 94.9%, by weight, preferably from 58 to 94.5%, by weight, of one or more aromatic monovinyl compounds; and
(III) from 0.1 to 15%, by weight, preferably from 0.5 to 12%, by weight, of (meth)acrylic acid or a (meth)acrylic acid alkyl ester.

The sum of components (I) to (III) amounts to 100%.

These graft copolymers have intrinsic viscosities of from 0.4 to 2.0, preferably from 0.6 to 1.5 dl/g, as measured in dimethyl formamide at 25° C.

In these products, the monomers are largely grafted onto the graft base. In addition, small quantities of ungrafted copolymer and ungrafted base may be present.

The grafting reaction may be carried out in homogeneous or heterogeneous phase.

If the grafting reaction is to be carried out in solution, the type of solvent used will be determined by the vinyl ester content of the copolymer. With vinyl ester contents below 30% by weight, the preferred solvents are aromatic hydrocarbons, such as benzene, toluene and chlorobenzene. With higher vinyl ester contents, alcohols, preferably t-butanol, are used as solvents.

The grafting reaction onto ethylene/vinyl ester copolymers may also be carried out in bulk. Bulk grafting is best carried out continuously. The average residence time in the reactor and the reaction temperature have to be adapted to the decomposition constant and concentration of the initiator in order to obtain a certain conversion and a sufficiently high molecular weight. This process guarantees a relatively uniform chemical distribution of the monomers in the resin phase.

The graft copolymerisation reaction may be initiated by irradiation or by radical-forming initiators. Suitable polymerisation initiators include azo compounds, such as azo-bis-isobutyronitrile and, in particular, percompounds, such as isopropyl peroxy dicarbonate, $\alpha$-ethyl hexyl peroxy dicarbonate, cyclohexyl peroxy dicarbonate, t-butyl perpivalate, t-butyl peroctoate, t-butyl perneodecanoate, diacetyl peroxide, lauroyl peroxide, succinyl peroxide and dibenzoyl peroxide.

Where polymerisation is carried out in solution, the amount of initiator is from 0.1 to 1.0, by weight, preferably from 0.3 to 0.5%, by weight, based on the monomer mixture used. The graft polymerisation reaction is carried out at temperatures of from 40° to 250° C., preferably from 60° to 120° C.

In order to obtain high molecular weights and good grafting yields, the graft polymerisation reaction is preferably started at relatively low temperatures, for example from 60° to 70° C., and completed at temperatures of from 80° to 100° C.

In order to obtain particular effects, for example cross-linking of the ethylene copolymer, the grafting reaction may also be carried out in aqueous heterogeneous phase.

To this end, the graft polymerisation reaction is preferably initiated by heating a solution of ethylene/vinyl ester copolymer in a mixture of the above-mentioned monomers to a reaction temperature of from 60° to 90° C. in the presence of from 0.01 to 0.5%, by weight, of a peroxide of the above-mentioned type. After the polymerisation reaction has proceeded to a conversion of from 20 to 30%, graft polymerisation is completed by bead polymerisation at from 80° to 100° C. by the addition of a mixture of water and a dispersant solution.

The ratio of the aqueous phase to the organic phase should amount to from 2:1 to 5:1.

Suitable dispersants are, for example, polyvinyl alcohol, partially hydrolysed polyvinyl acetate, cellulose derivatives, such as methyl or β-hydroxy ethyl cellulose, styrene/acrylic acid or hydrolysed styrene/maleic acid anhydride copolymers, methacrylic acid/methyl methacrylate copolymers, polyacrylamide or polyacrylic acid.

The dispersants are used in quantities of from 0.01 to 3% by weight, preferably from 0.5 to 2%, by weight, based on the organic phase used.

Where the bulk polymerisation reaction is carried out at from 80° to 120° C., the graft base undergoes partial cross-linking. This leads to improved mechanical properties, for example higher impact strength, and better processibility. The same effect may also be obtained by completing the polymerisation of a graft copolymer produced in bulk or in solution in a polymerisation screw at from 120° to 250° C. in the presence of a peroxide.

In the described processes, from 80 to 100% of the monomers are grafted onto the base, while in the absence of (meth)acrylic acid or (meth)acrylic acid alkyl ester about 30% by weight, and more of the monomers used (depending on the graft base used) are present as free copolymer under the same conditions.

The use of (meth)acrylic acid or (meth)acrylic acid alkyl ester leads to graft polymers characterised by a uniform chemical distribution. The fractionation of a graft copolymer (Example 11) with disintegrating liquids (dimethyl formamide/methyl cyclohexane) is mentioned by way of example (Table 1):

In this method, particularly pronounced separation occurs according to the chemical composition of the polymer molecules, i.e. according to the length of the graft branch and the molecular weight of the graft base (R. Kuhn, Makromolekulare Chem. 177 (1976) 1525). The methyl cyclohexane (MCH) phase contains ungrafted ethylene/vinyl acetate copolymer and a copolymer having few or short graft branches. The ungrafted resin and the graft base of low molecular weight are fractionated in the dimethyl formamide (DMF) phase.

The analytical values are indicative of differently grafted base which is partly attributable to the wide molecular weight distribution of the base. On the other hand, fractions of ungrafted base and free resin phase are with certainty very small because no further separation was possible by additional fractionation. The products obtained in accordance with the present invention are suitable for use as coating materials and thermoplastically processible plastics. They may be processed without difficulty in the machines commonly used in thermoplast technology.

Extruded or injection-moulded articles have a high surface gloss which could not be obtained in the absence of acrylates as graft activators. In addition, the elastomer phase and resin phase do not disintegrate under processing conditions.

Table 1

| Phase | % by weight | N[% by weight] | O[% by weight] | Graft yield [%] |
|---|---|---|---|---|
| DMF | 44.9 | 6.7 | 2.7 | ~ 70 |
| MCH | 55.1 | 3.3 | 8.4 | |

Fractionation with disintegrating liquids (DMF/MCH) (Example 11):

EXAMPLES 1 to 4

In a 40 liter capacity stirrer-equipped autoclave, 1500 g of an ethylene/vinyl acetate copolymer containing 45% by weight, of vinyl acetate and having a Mooney viscosity of 20 were dissolved in 15.7 kg of t-butanol at 60° C. and the resulting solution was purged with nitrogen. A mixture consisting of 2250 g of styrene, 750 g of acrylonitrile and (1) 15 g of methyl acrylate
(2) 77 g of methyl acrylate
(3) 240 g of methyl acrylate
(4) 410 g of methyl acrylate and 30 g of t-butyl perpivalate was then added at 60° C., followed by polymerisation for 6 hours at 60° C. The temperature was then increased to 80° C., after which two solutions consisting of 2250 g of styrene, 750 g of acrylonitrile and (1) 15 g of methyl acrylate
(2) 77 g of methyl acrylate
(3) 240 g of methyl acrylate
(4) 410 g of methyl acrylate and 40 g of t-butyl perpivalate in 1000 ml of t-butanol were pumped in over a period of 3 hours. Polymerisation was then completed over a period of 3 hours at 80° C. Solids contents of from 28 to 32% were reached. Working-up was carried out by precipitation in hot water and drying at 60° C. From 7 to 8.5 kg of a white powder-form graft copolymer was obtained.

EXAMPLES 5 to 8

The procedure was as in Examples 1 to 4, except that ethyl acrylate was added in corresponding quantities. The yields again amounted to from 7 to 8.5 kg of powder-form graft copolymers.

EXAMPLES 9 to 12

In these Examples, butyl acrylate was added in corresponding quantities instead of methyl acrylate, the procedure being as in Examples 1 to 4.

Table 2 shows the test results of the graft copolymers prepared in accordance with Examples 1 to 12. The tests were carried out in accordance with the following Standards:

| | | |
|---|---|---|
| Impact strength | $a_n$ | according to DIN 53 453 |
| Notched impact strength | $a_k$ | according to DIN 53 453 |
| Ball indentation hardness | $H_k$ after 30 seconds | according to DIN 53 456 |
| E-modulus in flexure | | according to DIN 53 457 |
| Vicat temperature, method B | | according to DIN 53 460. |

Table 2

Mechanical properties of the graft copolymers produced in accordance with Examples 1 to 12. The ethylene/vinyl acetate content amounts to 22.0%, by weight, in each sample.

| Example No. | Acrylate | [% by(1) weight] | $[\eta]^{(2)}$ [dl/g] | $a_n$ [KJ/$m^2$] | $a_k$ [kJ/$m^2$] | E-modulus in flexure [N/mm$^2$] | Vicat B [°C.] | $H_k$ [N/mm$^2$] |
|---|---|---|---|---|---|---|---|---|
| 1 | methyl acrylate | 0.5 | 0.66 | 31 | 3 | 2180 | 93 | 75 |
| 2 | " | 2.5 | 0.61 | 70 | 4 | 2210 | 92 | 76 |
| 3 | " | 7.5 | 0.73 | 33 | 3 | 2210 | 91 | 82 |
| 4 | " | 12.0 | 0.69 | 32 | 4 | 2360 | 92 | 86 |
| 5 | ethyl acrylate | 0.5 | 0.68 | 33 | 4 | 2330 | 96 | 84 |
| 6 | " | 2.5 | 0.68 | 28 | 3 | 2340 | 94 | 85 |
| 7 | " | 7.5 | 0.70 | 29 | 3 | 2320 | 91 | 84 |
| 8 | " | 12.0 | 0.64 | 28 | 3 | 2330 | 90 | 84 |
| 9 | n-butyl acrylate | 0.5 | 0.78 | 45 | 4 | 2990 | 95 | 79 |
| 10 | " | 2.5 | 0.40 | 48 | 3 | 2330 | 95 | 83 |
| 11 | " | 7.5 | 0.72 | 33 | 3 | 2390 | 92 | 87 |
| 12 | " | 12.0 | 0.56 | 27 | 3 | 2320 | 89 | 84 |

(1) based on the monomer used
(2) $[\eta]$: intrinsic viscosity, as measured in DMF at 25° C.

We claim:

1. A graft copolymer consisting of (A) 15 to 25% by weight of a graft base having (B) 85 to 75% by weight of a monomer mixture grafted thereon, said graft base being a copolymer consisting of copolymerized ethylene and vinyl ester, said copolymer having a Mooney viscosity (ML4/100° C.) of from 15 to 80 and an intrinsic viscosity of from 0.5 to 1.5 dl/g. and containing from 1 to 75% by weight of vinyl ester, said vinyl ester being a vinyl ester of an alkanoic acid having from 1 to 10 carbon atoms in the alkyl moiety thereof and said monomer mixture consisting of (I) from 5 to 50% by weight of (meth)acrylonitrile, (II) 94.9 to 35% by weight of at least one aromatic monovinyl compound and (III) from 0.1 to 15% by weight of (meth)acrylic acid or a (meth)acrylic acid $C_1$–$C_4$ alkyl esters.

2. A graft copolymer as claimed in claim 1 consisting of (A) an ethylene/vinyl acetate copolymer and (B) acrylonitrile, styrene and a (meth)acrylic acid $C_1$–$C_{12}$ alkyl ester.

3. A graft copolymer as claimed in claim 1 consisting of (A) an ethylene/vinyl acetate copolymer and (B) acrylonitrile, styrene and a (meth)acrylic acid $C_1$–$C_4$ alkyl ester.

4. A graft copolymer as claimed in claim 1 wherein (A) contains from 35–50% by weight of vinyl ester and (B) consists of from 5–30% by weight of (I), 94.5 to 58% by weight of (II) and from 0.5 to 12% by weight of (III).

* * * * *